United States Patent [19]

Okada et al.

[11] Patent Number: 4,890,929
[45] Date of Patent: Jan. 2, 1990

[54] METHOD AND APPARATUS FOR MANUFACTURING COAGULATED GRAINS FROM POLYMER LATEX

[75] Inventors: Wataru Okada; Hideo Yasui, both of Kobe; Yasuhiro Miki, Himeji, all of Japan

[73] Assignee: Kanegafuchi Kagaku Kogyo Kabushiki Kaisha, Osaka, Japan

[21] Appl. No.: 183,811

[22] Filed: Apr. 20, 1988

[30] Foreign Application Priority Data

Apr. 21, 1987 [JP] Japan .................................. 62-98088

[51] Int. Cl.⁴ ............................................. B01F 15/02
[52] U.S. Cl. ..................................... 366/160; 366/168; 366/177
[58] Field of Search ............... 366/136, 137, 150, 154, 366/159, 160, 161, 162, 167, 168, 172, 177, 108, 131

[56] References Cited

U.S. PATENT DOCUMENTS

| | | | |
|---|---|---|---|
| 1,656,990 | 1/1920 | Schwartz | 366/177 X |
| 3,068,167 | 12/1962 | White | 366/136 X |
| 3,230,047 | 1/1966 | Weinbrenner et al. | 366/168 X |
| 3,425,667 | 2/1969 | Schutte et al. | 366/161 X |
| 3,993,292 | 11/1976 | Skidmore | 366/87 |
| 4,107,793 | 8/1978 | Wallace | 366/312 |
| 4,259,022 | 3/1981 | Folland | 366/159 X |
| 4,336,328 | 6/1982 | Brown et al. | 366/184 X |
| 4,648,719 | 3/1987 | Roben | 366/177 X |

Primary Examiner—Robert W. Jenkins
Attorney, Agent, or Firm—Armstrong, Nikaido Marmelstein, Kubovcik & Murray

[57] ABSTRACT

The present invention provides a method of manufacturing coagulated grains from polymer latex and apparatus for exercising this method, said method being characterized in that a swirl of polymer latex is produced in tank, while holding it at a temperature lower than the softening temperature of the polymer latex particles and while letting the same polymer latex as said polymer latex fall down into the aforementioned swirl liquid surface, a coagulant is added into said latex flowing-down liquid, thereby letting the coagulant disperse and scatter into the latex in the tank; thereafter, with said coagulant thus scattered as the seeds, coagulated layers are grown on their outer surfaces. According to this invention, nearly spherical coagulated grains with a uniform grain size may be obtained, while suppressing possible formation of massive coagulated matters.

4 Claims, 1 Drawing Sheet

METHOD AND APPARATUS FOR MANUFACTURING COAGULATED GRAINS FROM POLYMER LATEX

BACKGROUND OF THE INVENTION

1. Field of the Invention

The present invention relates to a method and apparatus for manufacturing regularly arranged package of coagulated grains by making use of flocculation and coagulation of polymer latex particles obtained by emulsion polymerization, etc.

2. Description of the Prior Art

When recovering from polymer latex resinous polymer being its dispersed phase, generally, an aqueous solution of coagulant such as inorganic salts, acids, etc., is put into the latex, or conversely, the latex is put into such an aqueous solution of coagulant, whereby the latex is coagulated in the liquid phase and turned into a state of slurry by such an operation as heat treatment, etc., thereafter, to be in the state of powders or grains through dehydration and drying. However, in this method, the configuration of powder is amorphous, powder or grain diameter is difficult to adjust and the grain diameter distribution is broad, thus, the substantial amount of fine powders being contained therein. As a result, loss by scattering, frequent occurrence of process trouble due to blending with fine powders, deterioration of work environment resulting from dust generation, increased danger of dust explosion and other untoward incidences have been brought about.

For the purpose of overcoming these problems, very ardent efforts have been made in synthetic resin manufacturing field; for example, there have been proposed a method for recovering polymer latex as spherical coagulated grains by spraying it into a coagulable atmosphere or a method of recovering spherical coagualated grains by having coagulated grains absorbed in organic solvent droplets dispersed into water phase and, then, through removal of the solvent and solidification of coagulated matters.

The former method is disadvantageous in that its industrial application is difficult for manufacturing grains larger than 500 μm or for manufacturing highly heat resistant polymers having softening temperatures higher than 80° C. and that it is difficult to closely pack the grain interior, while the latter method has raised problems in the aspects of cost, quality, applicable range, grain characteristics, etc., that in addition to the difficulty in removal of solvent and inclusions and in close packing of grain interior, no organic solvents which are compatible with utilization of said method are available, depending on type of polymers. As a background of development of such a variety of recovery methods, there lies the current of the times that the degree that the acceptability of characteristics such as the particle size or its distribution or size or packing rate, etc., rather than the physical properties of polymers, influences the quality of the product is increasing.

And as a method for obtaining solid by directly drying latex, spray drying or vacuum granulation drying is available and numerous contrivances have been applied. With these methods, however, removal of inclusions in the latex is difficult, scale-up of facilities is required, when forming larger grains, and in addition, large amount of thermal energy is necessary with low density latices, resulting in high treating costs; thus, they are largely subject to restriction in the aspect of quality and cost.

On the other hand, the present inventors previously filed a patent application (European Publication No. 0217006) for an invention for obtaining nearly spherical grains as one which will overcome the above-mentioned disadvantages at once, in which coagulated grains grown with coagulant units dispersed and scattered into an aqueous particle colloid, to have the colloidal particles coagulated on the outer surfaces of these units, thereby laminating them from inside out.

As a result of subsequent examinations based on the previous invention, they found out the fact that when coagulated grains are intended to have by continuous operation, mere continuous supply of polymer latex and coagulant into a stirring tank will result in formation of a large mass of coagulum and growth of coagulated matters on the tank wall surface, stirrer, etc., or settling and accumulation of formed coagulated grains at the tank bottom, causing blockaded discharge port and the like problems, and the fact that as a consequence, not only continuation of long continuous operation is thwarted, but sometimes yiels is extremely lowered, and operability being dreadfully impeded. Further, when coagulant is merely added to the polymer latex liquid surface, the coagulant or the coagulated matters tend to float due to surface tension, forming united grains or amorphous grains, thus inviting reduced yield and lowered product quality. Accordingly, for realization of industrial production by this coagulation process, there has arisen a need for developing a method and apparatus which enables long and continuous production of spherical coagulated grains with a uniform grain diameter, by providing solutions to the aforementioned problems.

SUMMARY OF THE INVENTION

An object of this invention is to provide a method and apparatus developed with aims at not only preventing formation of massive coagulated matters, but continuously manufacturing spherical coagulated grains of arbitrary sizes.

Other objects and advantages of this invention will become evident to those skilled in the art from the detailed descriptions hereunder set forth:

The present inventors have, as a result of their assiduous research, found out the fact that while polymer latex is caused to flow down into the surface of the same latex which has gotten to be swirling in a tank, a coagulant is added into said flowing down latex, to be dispersed and scattered thereinto, thereby causing its coagulation, whereby the abovementioned object is achieved, and this finding has led to completion of this invention.

DETAILED DESCRIPTION OF THE INVENTION

Figure 1:
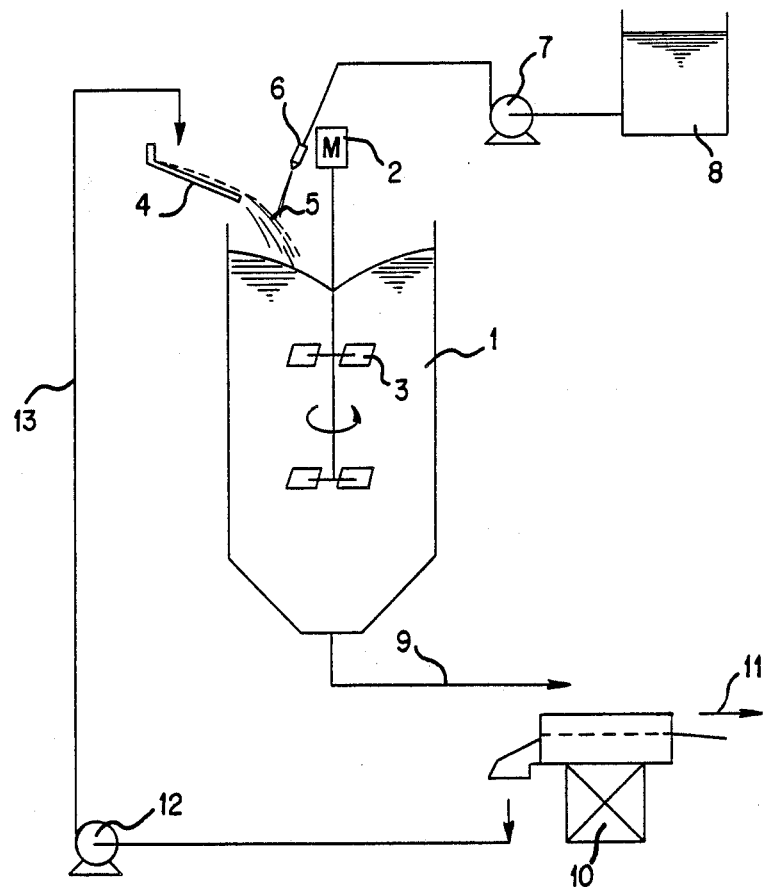
FIG. 1 is a schematic diagram illustrating an apparatus for exercising the method of this invention.

A first part of this invention comprises a method for manufacturing coagulated grains from polymer latex characterized in that a polymer latex is caused to be swirling in a tank, while being held lower than the temperature (softening temperature) at which the polymer latex grains unite by fusion, and while letting the same polymer latex as said polymer latex flow down into the surface of the aforementioned swirl at a temperature lower than the aforementioned softening temperature, a coagulant is added into the flowing down liquid of said latex, thereby causing said coagulant to be dispersed and scattered into the latex in the tank; thereafter, with said coagulant particles thus scattered as seeds, coagulated layers are grown on the outer surfaces thereof, whereby nearly spherical coagulated grains with a uniform grain size are obtained, while suppressing formation of massive coagulated matters.

And a second part of this invention comprises an apparatus for manufacturing nearly spherical coagulated grains with a uniform grain size characterized in that it is comprised of a tank for holding the polymer latex therein, an equipment for producing a swirl of latex in said tank, an equipment for letting said polymer latex flow down into the surface of said latex swirl and an equipment for adding the coagulant into the flowing down liquid of said latex.

Latices to which this invention is applicable are the following ones, for example; substantially they include almost all polymer latices which are obtained by emulsion or suspension polymerization and which are recoverable in resinous state.

Single or mixed latices of polymer latices formed by polymerization, copolymerization or graft-polymerization of monomer compositions mainly comprising one or two or more members of monomers selected from among the undermentioned monomer groups may be objects to which this invention is applicable. However, unpolymerizable ones are, of course, excluded. Vinyl aromatics such as styrene, monochlorostyrene, dichlorostyrene, α-methyl styrene, etc.; vinyl cyanides such as acrylonitrile, methacrylonitrile, etc.; acryl esters such as methyl acrylate, ethyl acrylate, butyl acrylate, etc.; methacryl esters such as methyl methacrylate, ethyl methacrylate, butyl methacrylate, etc.; halogenated vinyls such as vinyl chloride, vinyl bromide, vinyl fluoride, etc.; halogenated vinylidenes such as vinylidene chloride, vinylidene bromide, etc.; acrylic acid, methacrylic acid, itaconic acid, maleic acid, vinyl acetate, ethylene, propylene, butylene, butadiene, isoprene, chloroprene; and cross-linking monomers such as allyl methacrylate, diallyl phthalate, triallyl cyanurate, monoethylene glycol dimethacrylate, tetraethylene glycol dimethacrylate, divinyl benzene and glycidyl methacrylate.

Further, undermentioned polymer latices to which this invention is applicable are particularly preferable:

(1) Polymer latices obtained by polymerizing monomers consisting of 20-80 parts (part refers to part by weight hereinafter, unless otherwise specified) of acrylonitrile monomer, 20-80 parts of mixtures of one or two or more members of vinyl chloride, vinylidene chloride, vinyl bromide and vinylidene bromide and 0-10 parts of easily dyeable monomers.

(2) Butadiene base polymer latex consisting of 0-50% by weight of styrene (% refers to % by weight hereinafter, unless otherwise specified) and 50-100% of butadiene.

(2') Polymer latices obtained by polymerizing, in the presence of 20-80 parts of butadiene base polymer latex, 20-80 parts of monomers consisting of 0-50% of acrylic esters, 0-100% of methacrylic esters, 0-90% vinyl aromatics, 0-90% of vinyl cyanides and 0-20% of other copolymerizable monomers.

(3) Polymer latices obtained by polymerizing, in the presence of 0-20 parts of rubbery polymer latices consisting of 0-50% of styrene, 50-100% of butadiene and 0-30% of acrylic esters, 80-100 parts of monomers consisting of 0-100% of methyl methacrylate, 0-60% of other methacrylic esters exclusive of methyl methacrylate or acrylic esters, 0-90% of vinyl aromatics and 0-90% of vinyl cyanides.

(4) Mixed latices of 0-50 parts of graft copolymers (A) formed by polymerizing 10-90 parts of one or two or more members of monomers selected from among vinyl aromatics, methacrylic esters, acrylic esters and vinyl cyanides in the presence of 10-90 parts of butadiene base polymer consisting of 0-50% of styrene and 50-100% of butadiene, and 50-100 parts of polymers (B) formed by polymerizing monomers including 0-70 mol % of α-methyl styrene and 30-100 mol % of one or two or more members of monomers selected from among vinyl aromatics, methacrylic esters, acrylic esters, acrylic acid and vinyl cyanides.

(5) Polymer latices obtained by polymerizing 15-95 parts of one or two or more members of monomers selected from among methacrylic esters, vinyl cyanides, acrylic esters, vinyl aromatics and monomers copolymerizable with these compounds in the presence of 5-85 parts of rubbery polymers obtained by polymerizing 40-100% of acrylic esters, 0-60% of one or two or more of monomers selected from among vinyl aromatics, vinyl cyanides, vinyl chloride, vinylidene chloride, vinyl acetate and conjugated diolefins and 0-10% of cross-linking agents.

(6) Polymer latices obtained by polymerizing 40-100 parts of vinylidene chloride and 0-60 parts of one or two or more members of monomers selected from among vinyl aromatics, vinyl cyanides, acrylic esters, methacrylic esters, acrylic acid, methacrylic acid, itaconic acid, maleic acid and cross-linking monomers.

(7) Polymer latices obtained by polymerizing 40-100 parts of vinyl chloride, 0-20 parts of vinyl cyanide and 0-60 parts of one or two more members of monomers selected from among vinylidene chloride, vinyl bromide, vinylidene bromide, acrylic esters, methacrylic esters, acrylic acid, methacrylic acid, itaconic acid, maleic acid and cross-linking monomers.

(8) Polystyrene latices obtained by polymerizing 100% of styrene monomers.

(9) Polymer latices obtained by copolymerizing monomers including 0-80% of α-methyl styrene and 20-100% of one or two or more members of monomers selected from among vinyl aromatics, methacrylic esters, acrylic esters, acrylic acid and vinyl cyanides.

Coagulants usable in this invention are in the state of liquid or solid and include, e.g., inorganic salts such as sodium chloride, potassium chloride, lithium chloride, sodium bromide, potassium bromide, lithium bromide, potassium iodide, potassium sulfate, ammonium sulfate, sodium sulfate, ammonium chloride, sodium nitrate, potassium nitrate, calcium chloride, ferrous sulfate, magnesium sulfate, zinc sulfate, copper sulfate, barium chloride, ferrous chloride, magnesium chloride, ferric chloride, ferric sulfate, aluminum sulfate, potassium alum and iron alum, etc.; inorganic acids such as hydrochloric acid, sulfuric acid, phosphoric acid and nitric acid, etc.; inorganic alkalis such as caustic soda, caustic potash, calcium hydroxide and magnesium hydroxide, etc.; organic acids such as acetic acid and formic acid, etc.; and salts of organic acids such as sodium acetate, calcium acetate, sodium formate and calcium formate, etc.; these compounds may be used in the form of single or mixed solids, liquids, aqueous solutions or solutions in water-soluble organic solvents. Or solids may be added in slurry state by dispersing them in organic solvents in which they are hardly soluble but which are water-soluble.

The method or this invention is described hereunder: First, polymer latex is filled in a tank and a polymer latex's swirl is formed. This polymer latex's swirl has the function of rapidly dispersing and scattering in the tank the seed grains which serve as seeds in making growth of coagulated grains. Usable as an equipment for producing a polymer latex's swirl is one which forms a swirl by discharging latex in tangential direction to a stirring tank provided with no baffle plate or a cyclone type conical tank. And equipment usable as a stirring impeller, when a stirring tank provided with no baffle plate is used, may include a disc turbine, fan turbine, Pfaudler type, Brumagin type, propeller and H-type impellers, etc.; however, care is necessary with those which have discs like the disc turbines, for coagulated grains which have formed will sometimes deposit on their discs. And when inclined blades or a propeller impeller is used, and if the stirring is done in the up-flow direction, coagulated grains will recirculate in the vicinity of the latex swirl surface, so that they come in contact with the latex filmy downflow liquid, thus tending to form united coagulated grains, which is undesirable. The degree of turbulence of the polymer latex swirl may be set with the impeller Reynolds number $d^2 \cdot n/\nu$ (d: impeller diameter, n: number of revolution and $\nu$: kinetic viscosity) as a guide, the range from $5 \times 10^3$ to $5 \times 10^4$ being preferable. If its value is less than $5 \times 10^3$, the coagulated grains which have formed tend to settle and deposit on the tank bottom; thus, they unite with each other, causing their discharge port to be blockaded. But if the stirring conditions are such that its value is larger than $5 \times 10^4$, there will occur such a phenomenon as breakdown of the coagulated grains caused by the mixing impeller or pelling off of the coagulated grains surfaces due to mutual collision of coagulated grains under violent flowing state, wich is undesirable; if the breakdown of coagulated grains of the peeling of coagulated grains surfaces lasts long, the coagulant to be contained in each coagulated grain will go out of it, to be dissolved into the polymer latex, finally coagulating the whole of the polymer latex in the tank, thus making the formation of coagulated grains impossible.

Then, onto the aforementioned polymer latex swirl, the same polymer latex is caused to flow down in a liquid film state. The polymer latex film flowing-down liquid containing coagulated matters formed by the addition of a coagulant into the flowing-down liquid falls down into the polymer latex swirl; it has functions of not only fractionalizing the coagulated matters formed in the flowing-down liquid into fine seed particles by means of its falling energy but also submerging the seed particles which tend to float under influence of surface tension. The liquid film forming method comprises letting polymer latex flow along a "gutter" or plate and, then, letting the polymer latex fall down from an end of the "gutter" or plate, thereby forming a filmy liquid. The filmy flowing-down liquid may be produced by discharging polymer latex liquid through a rectangular discharge port or a perforated tube with holes arranged at such a pitch that the discharged polymer latex flows will be immediately united. The flow-down length of the liquid film is desirably not more than 2 m from the surface of the polymer latex swirl. If the flow-down length is in excess of 2 m, the amount of air entrained in the flowing-down liquid increases, resulting in violent foaming on the tank liquid surface; therefore, addition of an antifoaming agent, etc., should be contemplated. And the flow-down direction of the polymer latex filmy flowing-down liquid is desirably the same direction as that of the latex swirl; and further, the contacting points between the filmy flowing-down liquid and the latex swirl liquid surface is desirably radial from the tank center. If the flow-down direction is reversed, the latex swirl flow speed will decrease, undesirably leading to increased power consumption of mixing impeller.

Then, a coagulant is added to the filmy flowing-down liquid. If the coagulant is liquid, the addition of the coagulant may be made by injection through such a spray nozzle as single port nozzle, full cone nozzle, etc., or vibrated nozzle or perforated tube, etc. The bore size of the nozzle or the perforated tube is desirably not more than 3 mm in diameter; if bores larger than this are used, the diameter of the coagulated grains formed will become extremely large, the grain size distribution will be expanded and this will undesirably cause formation of amorphous coagulated grains, not spherical grains. And proper discharge pressure of liquid coagulant should be on such an order that the coagulant does not break through the polymer latex liquid film. If the coagulant pierces the polymer latex liquid film, it causes formation of large mass of coagulated matters, when it falls down into the swirl liquid surface; if the coagulant wets the tank wall surface, it will fall down along the wall surface, causing the latex to flocculate at the position of latex level, thereby undesirably yielding scale. On the other hand, if the coagulant is solid, powders, granules, crystals, etc., may be quantitatively added by such powder supplying means as belt feeder, screw feeder, roll feeder and vibrating feeder, etc. As for where the coagulant is to be added into the polymer latex filmy flowing-down liquid, it may be added into the flowing-down liquid at whatever position, but desirably, the area spreads in a direction at a right angle to the liquid flowing-down direction. If the adding direction is the same as its flowing down direction, the once coagulated matters will further come in contact with the coagulant, resulting in uneven coagulant concentrations in the coagulated matters, thus facilitating formation of amorphous coagulated grains. In contrast, when the coagulant is added by spreading it at a right angle to the liquid's flowing down direction, the once coagulated matters will go flowing down, without making contact with coagulant again, thus enabling the coagulant concentrations in the coagulated matters to be uniform.

The coagulated matters formed in the flowing down liquid falls down into the latex swirl together with the flowing-down liquid and by its energy, they will be fractionalized to be dispersed as coagulated grains. In each of these fine coagulated grains, there is contained a high concentration of coagulant; while they are staying in the tank for a specified time period, the coagulant will gradually come out, to pile coagulated layers one upon another, thereby getting the coagulated grains go on growing. The fine coagulated grains which have fallen to be fractionalized provide seeds for growing coagulated grains. If the coagulated matters which have fallen together with the flowing-down liquid have been fractionalized and are staying in the neighborhood of the place where they have fallen, other coagulated matters will fall down thereon one after another, thus, tending to form massive coagulated matters and united grains. To forestall this, the latex swirl quickly carries off the fractionalized fine grains from the fall-down position of the latex filmy flowing-down liquid, to get them diffused and scattered, without allowing the fine grains containing high concentrations of coagulant to be united. When the concentration of the coagulated grains formed is desired to be increased, it is proper to increase the amount of the coagulant added, but as the addition is increased, the increase of the discharge pressure from the nozzle and the concentration of the fine grains containing high concentrations of coagulant near the liquid's falling-in position will become excessive; accordingly, the increase in the formation of massive coagulated matters and the united grains formation frequency is limited and as a countermeasure, it is effective to let flow down the flowing-down liquid at two or three or other plural numbers of positions.

In the fine grains containing high concentrations of coagulant which have been dispersed in the polymer latex swirl, the coagulant existing at the center of each of said grains will move by diffusion to the grain surface, while they are staying in the tank, to have the latex particles coagulated and laminated on the grain surfaces; as a result, the coagulated grains will grow larger. At this time, the coagulated grains will become nearly spherical coagulated grains closely and regularly packed with polymer latex particles.

The coagulated grains which have grown, while staying for a specified time period in a tank having the polymer latex swirl, are discharged from inside the tank. As the discharging method, a scooping method with a basket or a method of drawing them out as a mixed flow of the coagulated grains and the polymer latex, etc., may be used, but as the coagulated grains grow, they tend to settle and, therefore, the method of discharging from the tank bottoms as their mixed flow with polymer latex is preferable. The coagulated grains formed are discharged, together with polymer latex, and only the coagulated grains formed may be taken out by means of such a solid-liquid separating means as an inclined screen separator, vibratory screen separator, etc. On the other hand, the polymer latex separated from the coagulated grains formed is again returned to the tank, to be used as the polymer latex filmy flowing down liquid.

According to this invention, the temperature of the polymer latex and that of the latex swirling and residing in a tank needs to be a temperature lower than its softening temperature. The softening temperature as used here means a temperature at which the latex particles mutually fuse together under atmospheric pressure; generally, it is considered to be the melting point of a substance. However, since definite melting points can not be defined for polymers, they are hardly definable. Even the same polymer's melting point will not be determined by the polymerization degree or its distribution only, but will be largely influenced by its crystalinity or additives which provide plasticizing effect. However, actually, it is reasonably considered to fall within the range of $$\{[(Tg+273)/0.8]-273 \sim [(Tg+273)/0.6]-273\} \,°C.,$$

assuming that the glass transition point is Tg (°C).

If the coagulated grains are formed in the state of being held at a temperature higher than their softening temperature, the polymer latex particles, being the basic particles, will mutually unite with each other by fusion, giving rise to dispersions in the size and the sphericity of the united grains; accordingly, they could not be coagulated grains having polymer latex particles fully packed therein in regular arrangement. Affordingly, the temperature of the polymer latex when forming coagulated grains needs to be lower than its softening temperature.

In the following, this invention will be described in conjunction with the accompanying drawing:

FIG. 1 is a schematic diagram illustrating an apparatus for use in exercising the method of this invention: Numeral 1 designates a tank for forming a polymer latex swirl; after filling the tank with polymer latex, a mixing impeller 3 is turned by means of a stirrer motor 2, thereby producing a polymer latex swirl in the tank 1. On the other hand, the polymer latex is led to the filmy flowing down liquid forming channel 4 through a liquid film forming polymer latex feeding line 13; thereafter, the polymer latex is caused to flow down from an end of said channel 4, thereby forming a filmy flowing-down liquid 5. Into this flowing-down liquid 5, a coagulant is discharged from a coagulant storage tank 8 through a spray nozzle 6, using a coagulant adding pump 7. The coagulated matters formed in the flowing down liquid 5 fall down into the polymer latex swirl liquid surface, to be fractionalized and diffused and scattered in the tank. The coagulated grains which have grown while staying in said tank for a specified time period are discharged together with the polymer latex from the tank bottom through a line 9; then, the mixture is separated into coagulated grains and polymer latex in a solid-liquid separating means like a vibratory screen separator 10 and the coagulated grains thus formed are taken out through another line 11. And the polymer latex after this solid-liquid separation is recycled by means of a liquid film forming latex feeding pump 12, to be reused as the polymer latex filmy flowing-down liquid.

When forming coagulated grains by the method and the apparatus of this invention, the coagulated matters which are formed by adding a coagulant into the polymer latex filmy flowing down liquid are fractionalized by the energy of the flowing down liquid, as it is falling into the latex swirl, to be fine coagulated grains containing high concentrations of coagulant. At this time, in the fractionalization of coagulated matters, the size of the fine coagulated grains containing high concentrations of coagulant may be freely controlled by adjusting the level from which the flowing down liquid is caused to fall or the coagulant adding position, depending on the hardness of the coagulated matters, so that not only the formation of massive coagulated matters may be thwarted, but the grain diameter of the coagulated grains thus formed may be adjusted to any arbitrary size. And the fine coagulated grains containing high concentrations of coagulant will be sunk into the latex swirl by the flowing-down liquid; accordingly, fine coagulated grains containing high concentrations of coagulant will not float on the latex level under the influence of the surface tension, thus foreclosing formation of united grains or amorphous grains. Further, the fractionalized fine coagulated grains containing high concentrations of coagulant are rapidly shifted due to the polymer latex swirl from the position where the latex flowing-down liquid has fallen down, so that they go on growing, while flowing along the latex swirl stream line. Accordingly, the coagulated grains while in growth rarely meet and unite with coagulated grains containing high concentrations of coagulant; thus, this system is quite effective in thwarting formation of massive coagulated matters and united grains.

As hereabove described, the present invention enables controlling the size of coagulated grains and thwarting formation of united grains, thereby effecting prevention of blockading of discharge port caused by massive coagulated matters or united grains and permitting for a long time stable growth of coagulated grains by way of continuous operation.

Since, according to this invention, the latex swirl is always flowing along the tank wall surface, the coagulated grains are running without sticking on the tank wall surface. Accordingly, this process is entirely free of scaling problem resulting from deposition of coagulated grains on the tank wall surface.

This invention permits spherical grains having arbitrary mean grain diameters to be taken out at the solid-liquid separation time, with a result that generation of fine powders after the drying process which was a disadvantage in the previous method is eliminated, that powder handling is facilitated and that an environment free of dust is realizable at the processing time with these grains, and such other great merits are expectable.

Since, when continuous operation is run, the coagulated grains are taken out of the system by way of solid-liquid separation and will never again return to the tank, the mean coagulated grains forming time is equal to the mean residence time V/F (min), assuming the amount of polymer latex discharged through the polymer latex tank bottom to be F (kg/min), and the amount of the polymer latex in the tank V (kg). Accordingly, the coagulated grains forming time will be subject to control by operationally adjusting the aforementioned mean residence time, so that adjustment of grain diameter may be made easily, thereby to form coagulated grains with a uniform grain size. The coagulated grains' mean residence time in the continuous operation preferably fall in the range of 2-10 min.

In the following, explanations are taken in connection with Examples of this invention and a Comparison Example, but it will never be restricted thereby.

EXAMPLE 1

A 30 cm inside diameter stirring tank having no baffle plate was filled with 42 kg of polymer latex with solid content of 30% and held at a temperature of 25° C. being a polymer latex having mixed together 33% of polymer latex (A) being a polymer latex formed by graft-copolymerizing on butadiene polymer a mixture of styrene, acrylonitrile and methyl methacrylate and consisting of 60% butadiene, 10% of methyl methacrylate, 10% of acrylonitrile and 20% of styrene, and 67% of homocopolymer latex (B) consisting of 20% of α-methyl styrene, 25% of acrylonitrile and 55% of styrene; then, the latex in the tank was stirred in down-flow direction with three bladed propeller type impeller of 20 cm diameter at 200 rpm, thereby forming a polymer latex swirl. Then the polymer latex was discharged through the tank bottom at a flow rate of 10.5 kg/min, to be again let fall down from an 8 cm wide channel into the latex swirl as a polymer latex filmy flowing-down liquid. At this time, the height from the end of the channel to the latex swirl level was set at 25 cm. Thereafter, as a coagulant, 30% aqueous solution of calcium chloride was sprayed at 38 ml/min through two 0.6 mm φ single hole nozzles, using a peristaltic feeding pump, to be added into the polymer latex filmy flowing-down liquid. Through the tank bottom, a mixed flow of the coagulated grains formed and the polymer latex was discharged at 10.5 kg/min; then, as it was subjected to solid-liquid separation by the use of a 20 mesh vibratory screen separator, the amount of the coagulated grains only discharged became nearly constant 20 min after starting the continuous operation, enabling coagulated grains to be formed at a rate of approximately 2.1 kg per minute. For the amount of polymer latex after subjected to the solid-liquid separation which was reduced by the coagulated grain formation, new polymer latex was replenished and this latex was recycled into the tank at a flow rate of 10.5 kg/min. Accordingly, the mean residence time in this continuous operation was 4 min.

When grain diameter measurement and shape observation of the coagulated grains formed after running continuous operation for 60 min was made, the coagulated grains formed were found to be nearly spherical grains with a uniform grain size of 4.4 mm mean grain diameter and no united grains grown by mutual unification of grains were observed.

EXAMPLE 2

After forming a polymer latex swirl under the same stirring conditions, using the same polymer latex and apparatus, as in Example 1, the polymer latex was discharged through the tank bottom at a flow rate of 18 kg/min. Of the latex thus discharged, 10.5 kg/min was let fall down as the polymer latex filmy flowing-down liquid through the same channel as that of Example 1, while the remaining polymer latex was recycled into the tank with another pump. Thereafter, a coagulant was added to the flowing down liquid, using the same apparatus and conditions as in Example 1, thereby forming coagulated grains. Through the tank bottom, an 18 kg/min mixed flow of the coagulated grains formed and the polymer latex was discharged and subjected to solid-liquid separation using a 20 mesh vibratory screen separator, whereby 20 min later, coagulated grains were obtained at a rate of approximately 2.0 kg/min. Recycling into the tank was done at a rate of 10.5 kg/min for liquid film formation and 7.5 kg/min directly into the tank, totalling 18 kg/min, while supplementing new polymer latex to the separated latex after the solid-liquid separation; accordingly, the mean residence time in this continuous operation was 2.3 min.

The sample of the coagulated grains formed 60 min later were nearly spherical grains with a uniform grain size 3.2 mm mean grain diameter and almost no united grains were observed.

Examples 1 and 2 clearly suggest that the grain diameter of the coagulated grains formed may be adjusted by altering the mean residence time in the continuous operation.

EXAMPLE 3

A swirl of polymer latex was formed under the same stirring condition, using the same polymer latex and apparatus, as in Example 1. Then, the polymer latex was discharged through the tank bottom at a flow rate of 10.5 kg/min, to be let flow down into the latex swirl as the polymer latex filmy flowing down liquid. Thereafter, as a coagulant, calcium chloride anhydride grains (grains sifted beforehand which passed 28 mesh, but retained on 32 mesh screen) were added into the polymer latex filmy flowing-down liquid at a rate of approximately 12.5 g/min by a vibrating powder feeder. As a mixed liquid of the coagulated grains formed and the polymer latex was discharged at 10.5 kg/min through the tank bottom and subjected to solid-liquid separation using a 20 mesh vibratory screen separator, the amount of the coagulated grains only discharged became nearly constant approximately 20 min after starting the continuous operation, enabling the coagulated grains to be formed at a rate of 2.0 kg/min. As the grain diameter measurement and shape observation of the coagulated grains was made after 60 min continuous operation while seplenishing fresh polymer latex, the coagulated grains formed were found to be nearly spherical grains with a uniform grain size of 3.8 mm average grain diameter and mutual unification of grains was barely observed.

EXAMPLE 4

A latex swirl was formed under the same stirring condition using the same apparatus, as in Example 1, while holding at 70° C. polystyrene latex with solid content of 14% which was obtained by polymerization of styrene monomer only, without using an emulsifier but with ammonium persulfate as a polymerization initator. Then the latex was discharged through the tank bottom at a flow rate of 8.4 kg/min and let fall down into the latex swirl as the latex filmy flowing-down liquid. Thereafter, the same calcium chloride anhydride as that of Example 3 was added into the filmy flowing-down liquid at a rate of approximately 12.5 g/min by a vibrating powder feeder. Through the tank bottom, a mixed flow of the coagulated grains formed and the polystyrene latex was discharged at 8.4 kg/min; then, as this mixed flow was subjected to solid-liquid separation, using a 20 mesh vibratory screen separator, the amount of the coagulated grains only discharged became nearly constant approximately 20 min after starting the continuous operation, thereby enabling the coagulated grains to be formed at a rate of 1.9 kg/min. As the grain diameter measurement and shape observation of coagulated grains were made, after continuing the operation for 60 min while supplementing polystyrene latex, the coagulated grains formed were found to be nearly spherical grains with a uniform grain size of 3.3 mm average grain diameter.

COMPARATIVE EXAMPLE 1

A 40 l stirring tank equipped with four baffle plates was filled with 25 kg of the same polymer latex as that of Example 1 and its content was stirred at 200 rpm with 10 cm diameter flat 4 blade turbine impeller. Thereafter, as a coagulant, 30% aqueous solution of calcium chloride was added into the polymer latex liquid surface through a 4 mm $\phi$ ID tube at 23 ml/min, using a constant rate pump. From 5 min after starting the addition of coagulant, a mixed flow of the coagulated grains and the polymer latex was drawn out of the tank at a discharge rate of 6.5 kg/min and subjected to solid-liquid separation, using a 20 mesh vibratory screen separator, and the polymer latex was recycled inside the tank at a flow rate of 6.5 kg/min with supplementation of new polymer latex. When continuous operation was run under this condition, massive coagulated grains and amorphous coagulated grains were formed in large amounts and even though a 40 mm $\phi$ piping was used for the discharge port, the mixed flow discharge of the coagulated grains and the polymer latex was not smooth, with the discharge port blockaded 35 min after starting the operation, resulting in shutdown of the operation. As the inside of the tank was observed after the shutdown, a large amount of scale was found to have grown and been sticking on the baffle plates and tank wall liquid surface.

What is claimed is:

1. An apparatus for manufacturing from polymer latex nearly spherical coagulated grains with a uniform grain size, comprising:
    (a) a tank for holding said polymer latex;
    (b) means for forming a down-flowing swirl of said polymer latex in said tank;
    (c) means for providing a film of down-flowing polymer latex from above the surface of the swirling polymer latex in said tank onto said surface of the swirling polymer latex, said means for providing a film of down-flowing polymer latex being provided with an inlet into which polymer latex is fed;
    (d) means for continuously metering a flow of coagulant to impact said film of down-flowing polymer latex at an angle and at a position above said surface of the swirling polymer latex, said means for metering being provided with means for regulating the discharge pressure of said flow of coagulant so that the flow of coagulant does not pass through said film of down-flowing polymer latex; and
    (e) means for separating coagulated grains of polymer latex from said polymer latex.

2. The apparatus according to claim 1, wherein said means for providing a film of down-flowing polymer latex is provided so that the points of contact between the film of down-flowing polymer latex and the surface of the swirling polymer latex in the tank extend radially from the center of said tank.

3. The apparatus according to claim 1, wherein said means for continuously metering a flow of coagulant is provided so that said flow of coagulant impacts said film of down-flowing polymer latex only once.

4. The apparatus according to claim 1, further comprising means for recycling the polymer latex separated from the coagulated grains of polymer latex back to the inlet of said means for providing a film of down-flowing polymer latex.

* * * * *